Patented July 31, 1928.

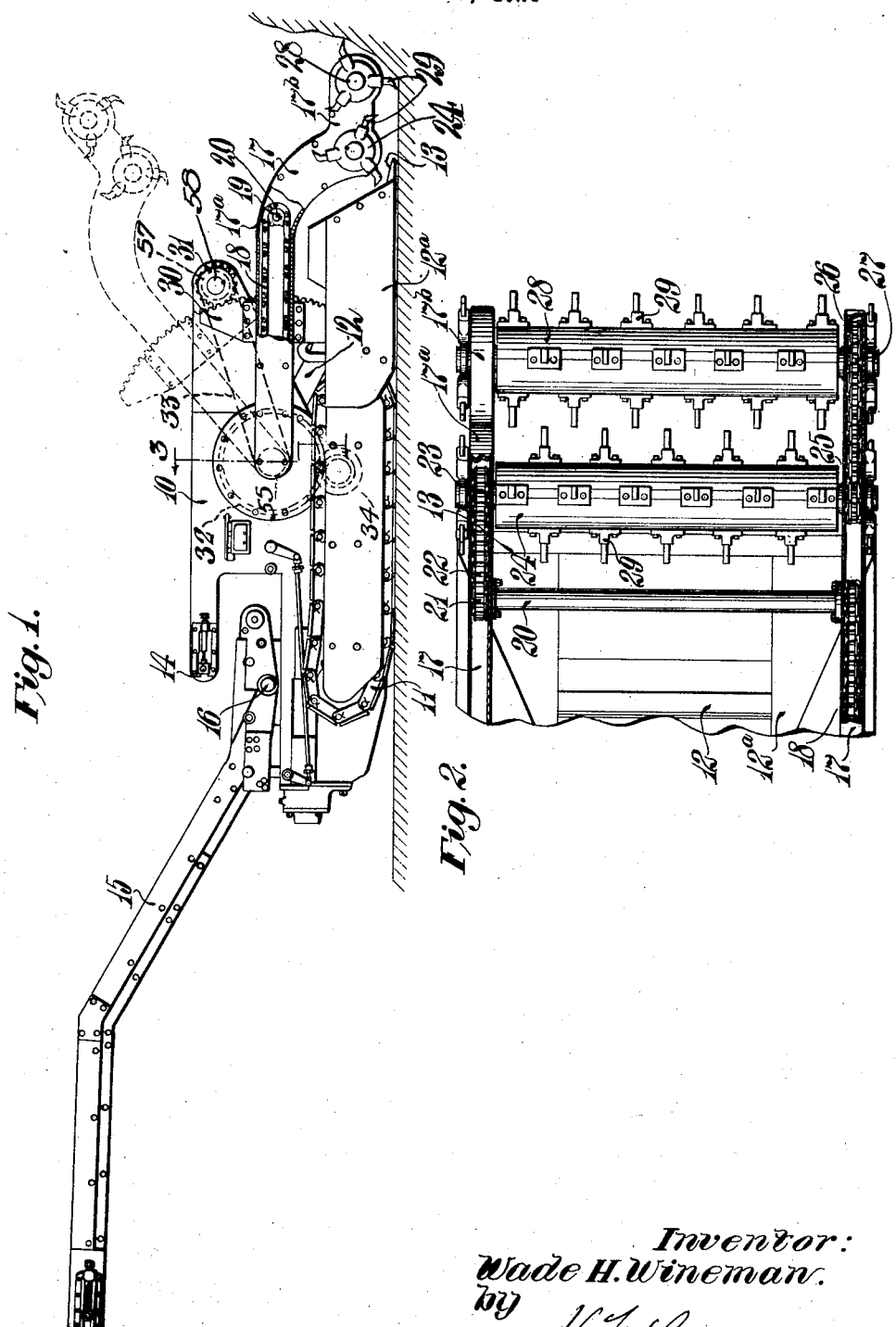

1,679,143

UNITED STATES PATENT OFFICE.

WADE H. WINEMAN, OF MICHIGAN CITY, INDIANA, ASSIGNOR TO SULLIVAN MACHINERY COMPANY, A CORPORATION OF MASSACHUSETTS.

LOADING MECHANISM.

Application filed January 23, 1926. Serial No. 83,367.

This invention relates to apparatus for gathering and conveying loose material and more specifically to a machine for mechanically loading coal.

The main object of the invention is to provide mechanism that will efficiently pull down or rake broken coal or similar loose material toward cooperating conveying means, the purpose being to increase the capacity of such devices by providing a construction capable of moving a greater amount of material at each cycle of operation than similar structures heretofore known. A further object of the invention is to increase the speed at which material is handled and provide for greater advance of the machine at each step thereof toward the material being handled.

The foregoing and other minor objects are attained by providing a loading machine of the type having a conveyor for receiving and moving material with a novel form of gathering means consisting, in one specific form, of a pair of cooperating rotary toothed members carried on the ends of pivoted arms and so positioned with reference to the conveying means that the arc of movement of the arms carries the gathering elements downwardly through the loose mass of material to be loaded and moves the same toward the conveyor, thereby handling more material and clearing a path for advance of the conveying means co-extensive with the horizontal extent of the rotary gathering members.

The invention accordingly resides in the organization, details of construction, parts, or equivalents thereof, hereinafter more fully described and then defined in the claims.

In the accompanying drawings I have shown for purposes of illustration one form which my invention may assume in practice.

In these drawings,—

Fig. 1 is a side view of a loading machine including the novel feeding means.

Fig. 2 is a sectional plan view of the rakes comprising the feeding means.

In the present instance the novel structure embodying the invention has been illustrated in combination with a loading machine comprising an oblong body 10 which is transportable on endless treads 11. The body 10 carries an upwardly inclined conveyor 12 the lower end of which is shown in Fig. 2, this conveyor having a receiving end in the form of a shovel or scoop 12ª having a horizontally extending edge 13. The rear end 14 of this conveyor (Fig. 1) overhangs the receiving end of a tail conveyor 15 which is swiveled on the rear of the machine to swing for adjustment through an arc of at least 180° and also pivoted at 16 for vertical adjustment. It will be understood that the endless treads and conveyors described are driven from a source of power contained in the machine through suitable mechanism, which will not be described as the structure so far referred to forms no part of the present invention except as it cooperates therewith.

In order to feed the material to be handled on to the receiving end 12ª of the conveyor 12, there is provided on each side of the machine a supporting member or arm 17. These arms are pivoted to the machine body at a point substantially midway of its length and extend forwardly to a point beyond the horizontal edge 13 of the receiving end of the elevator. Preferably the arms 17 are formed with radially extending portions 17ª and with downwardly offset or depressed portions 17ᵇ extending outwardly in a direction parallel to the portions 17ª. The portions 17ᵇ of the carrying arms have journaled therein a plurality, in this instance a pair, of rotary gathering or feeding rakes extending transversely of the receiving end of the elevator and preferably, though not necessarily, identical in structure and arranged on parallel axes extending completely across the machine. These rakes are positively driven in any preferred manner as will hereinafter be more fully described from the source of power in the machine and as one manner of driving them there is shown a sprocket chain 18 which is driven from a sprocket coaxial with the pivot of the arm 17 and drives a sprocket 19 on one end of a transverse shaft housed within the tubular spacing member 20. At its opposite end this shaft carries a sprocket 21 which drives a chain 22 passing over a sprocket 23 fixed on the adjacent end of the rotary rake 24. At its opposite end the rake 24 has fixed to it a sprocket 25 which drives a chain 26 passing over a sprocket 27 fixed on the adjacent end of the rake 28. By this means it will be evident that the two rakes will be jointly driven for rotation in the same clockwise direction. The rotary gathering or feeding means may be of any desired construction and in this instance are shown as cylinders having fixed to the surface thereof, in staggered relation, successive rows of teeth 29. As means for raising and lowering the arms 17 and with them the gathering means, the arms are provided at an intermediate point with arcuate racks 30 which are fixed thereto and cooperate with driving pinions 31 journaled on a shaft extending across the forward end of the machine body above the receiving end of the conveyor. The shaft and pinions 31 are preferably driven by power through suitable gearing 32 and a chain and sprocket connection 33 and controlled by suitable clutch mechanism 34 so that the gathering mechanism may be moved from the position illustrated in dotted lines in Fig. 1 to that shown in solid lines and vice versa. It is intended that the drive of pinions 31 shall be so controlled by the clutch mechanism 34 that they may be freed from the driving connection when the arms 17 are in elevated positions thereby permitting the gathering means to move downward by gravity if desired.

In operation the machine is advanced by its treads toward a pile of loose material, such as broken coal which is to be conveyed rearwardly, with the gathering mechanism elevated as shown in dotted lines in Fig. 1. When the forward edge of the conveyor has reached and penetrated the material to be loaded and further travel stopped, the arms 17 are either positively moved downwardly under power or released to move downwardly of their own weight, as conditions may require, while the rotary rakes 24 and 28 are driven. As these engage the material the roller 28 will first engage and move it toward roller 24 which in turn will pass it backwardly toward the receiving end of the conveyor 12. As the rotary rakes move downwardly they gradually approach a position in which the rake teeth engage the mine bottom and the axes of both lie in the same horizontal plane above and in advance of the receiving end of the conveyor, thereby clearing a path in advance of the edge 13 equal to the space occupied by the two rakes. The arms 17 are thereupon raised, the machine advanced over the cleared space and the gathering operation repeated.

While I have in this application specifically described one form which my invention may assume, it will be understood that this form of the same is shown for purposes of illustration and that the invention may be modified and embodied in various other forms without departing from its spirit or the scope of the appended claims.

What I claim as new and desire to secure by Letters Patent is:

1. The combination with loading mechanism comprising a body and a conveyor thereon having a material receiving end, of means for feeding material towards said end comprising a plurality of cooperating rotary material engaging devices movable about separate axes disposed transversely of the receiving end, said devices being connected to the body by means providing for vertical movement thereof, one of said devices receiving material brought back by the other device and moving the material onto the receiving end of said conveyor.

2. The combination with loading mechanism comprising a body and a conveyor thereon having a material receiving end, of means for feeding material towards said end comprising a plurality of cooperating front and rear rotary material engaging devices movable about separate axes disposed transversely of the receiving end in advance thereof, said devices being connected to the body by means providing for vertical movement thereof, the rear device receiving material brought back by the front device and moving the material onto the receiving end of said conveyor.

3. The combination with loading mechanism comprising a body and a conveyor thereon having a material receiving end, of means for feeding material towards said end comprising a plurality of cooperating front and rear rotary raking devices extending across the receiving end on parallel axes and connected to the body by means providing for vertical movement of said devices, the rear device receiving material brought back by the front device and moving the material onto the receiving end of said conveyor.

4. The combination with loading mechanism comprising a body and a conveyor thereon having a material receiving end, of means for feeding material towards said end comprising a plurality of cooperating front and rear rotary raking devices extending across the receiving end on parallel axes and connected to the body by means providing for vertical movement of said devices, the axes of said devices when in lowered position being in advance of said receiving end, the rear device receiving material brought back by the front device and moving the material onto the receiving end of said conveyor.

5. The combination with loading mechanism comprising a body and a conveyor thereon having a material receiving end, of means for feeding material towards said end comprising a plurality of cooperating front and rear rotary raking devices extending across the receiving end on parallel axes spaced from each other in a direction away from said end and connected to the body by means providing for vertical movement of said devices, the rear device receiving material brought back by the the front device and moving the material onto the receiving end of said conveyor.

6. The combination with loading mechanism comprising an oblong body and a conveyor extending longitudinally thereof and having a material receiving end, of means for feeding material towards said end comprising supporting members pivoted at an intermediate point on said body and extending from their pivots towards said end and a plurality of inner and outer raking devices carried by the outer ends of said members and rotatable about separate axes, said raking devices being positioned to engage material in advance of the conveyor receiving end, the inner device receiving material brought back by the outer device and moving the material onto the receiving end of said conveyor.

7. The combination with loading mechanism comprising an oblong body and a conveyor extending longitudinally thereof and having a material receiving end, of means for feeding material towards said end comprising supporting members pivoted at an intermediate point on said body and extending from their pivots towards said end and a plurality of inner and outer raking devices carried by the outer ends of said members and rotatable on separate parallel axes spaced from each other in a direction away from said body and having arcs of movement extending in advance of said receiving end, the inner device receiving material brought back by the outer device and moving the material onto the receiving end of said conveyor.

8. The combination with loading mechanism comprising an oblong body and a conveyor extending longitudinally thereof and having a material receiving end, of means for feeding material towards said end comprising supporting members pivoted at an intermediate point on said body and extending from their pivots towards said end, said members having depressed end portions extending parallel to said extending portions thereof, said depressed portions extending in advance of the material receiving end of the conveyor when in lowermost position, and a plurality of non-coaxial rotary raking devices carried on said depressed portions in position to act on material in advance of said receiving end.

9. In combination, a loading machine having a material receiving portion an edge of which extends horizontally, and material feeding means comprising a plurality of inner and outer rotary raking means arranged one in advance of another and carried on supporting means pivotally connected to the machine, said rotary raking means being movable towards and from said edge of the receiving portion and so positioned on said supporting means as to bring the axes about which the raking means rotate into the same horizontal plane above said edge at one extreme of movement of said supporting means, the inner device receiving material brought back by the outer device and moving the material onto the receiving end of said conveyor.

10. The combination with loading mechanism comprising a body and a conveyor thereon having a material receiving end, of means for feeding material towards said end comprising parallel arms pivotally mounted at their rear ends on said body and carrying at their forward ends a plurality of cooperating toothed rollers rotatable about separate, non-alined axes disposed transversely of the receiving end, mechanism for simultaneously rotating said rollers in the same direction, and mechanism for swinging said arms relative to said body to vary the elevation of said rollers.

11. The combination with loading mechanism comprising a body and a conveyor thereon having a material receiving end, of means for feeding material towards said end comprising a pair of parallel arms pivotally mounted at their rear ends on said body and carrying at their forward ends cooperating front and rear toothed rollers rotatable about separate axes disposed transversely of the receiving end, the rear roller receiving material brought back by the front roller and moving the material onto said receiving end of said conveyor, mechanism for simultaneously rotating said rollers in the same direction, and mechanism for swinging said arms relative to said body to vary the elevation of said rollers, said latter mechanism including means for permitting downward movement of said rollers by gravity.

In testimony whereof I affix my signature.

WADE H. WINEMAN.